US012595834B2

(12) United States Patent
Koyama et al.

(10) Patent No.: US 12,595,834 B2
(45) Date of Patent: Apr. 7, 2026

(54) SEALING DEVICE AND DAMPER FOR HYDRAULIC EQUIPMENT

(71) Applicant: KYB Corporation, Tokyo (JP)

(72) Inventors: Masaki Koyama, Tokyo (JP); Norihiro Asano, Tokyo (JP); Takeshi Yasui, Tokyo (JP)

(73) Assignee: KYB Corporation, Tokyo (JP)

( * ) Notice: Subject to any disclaimer, the term of this patent is extended or adjusted under 35 U.S.C. 154(b) by 393 days.

(21) Appl. No.: 18/032,295

(22) PCT Filed: Nov. 30, 2021

(86) PCT No.: PCT/JP2021/043946
§ 371 (c)(1),
(2) Date: Apr. 17, 2023

(87) PCT Pub. No.: WO2022/130968
PCT Pub. Date: Jun. 23, 2022

(65) Prior Publication Data
US 2023/0392666 A1 Dec. 7, 2023

(30) Foreign Application Priority Data

Dec. 17, 2020 (JP) ................................. 2020-208877

(51) Int. Cl.
*F16F 9/32* (2006.01)
*B60G 13/08* (2006.01)
(Continued)

(52) U.S. Cl.
CPC ............ *F16F 9/368* (2013.01); *F16F 9/3214* (2013.01); *F16F 9/3278* (2013.01); *F16F 9/348* (2013.01);
(Continued)

(58) Field of Classification Search
CPC .. F16F 9/36; F16F 9/368; F16F 9/3214; F16F 9/348; F16F 9/3278; F16F 9/5126;
(Continued)

(56) References Cited

U.S. PATENT DOCUMENTS

| | | | | |
|---|---|---|---|---|
| 2,386,873 A | * | 10/1945 | Mercier | ................. F16J 15/166 |
| | | | | 277/587 |
| 2,462,596 A | * | 2/1949 | Bent | ........................ F16J 15/32 |
| | | | | 277/910 |

(Continued)

FOREIGN PATENT DOCUMENTS

| | | |
|---|---|---|
| JP | H08-075003 A | 3/1996 |
| JP | 2005-226517 A | 8/2005 |

(Continued)

OTHER PUBLICATIONS

Jun. 3, 2025, Japanese Office Action issued for related JP Application No. 2020-208877.

(Continued)

*Primary Examiner* — Robert A. Siconolfi
*Assistant Examiner* — James K Hsiao
(74) *Attorney, Agent, or Firm* — Paratus Law Group, PLLC

(57) ABSTRACT

A sealing device for hydraulic equipment according to the invention includes an outer member having an annular shape, an inner member inserted into the outer member, and a seal ring housed in an annular groove disposed in the outer circumference of the inner member and abutting on the outer member to prevent a liquid from passing through a gap between the outer member and the inner member. The annular groove of the inner member has a bottom portion including a recess for restraining axial displacement of the seal ring relative to the annular groove.

8 Claims, 5 Drawing Sheets

(51) Int. Cl.

| | |
|---|---|
| *F16F 9/348* | (2006.01) |
| *F16F 9/36* | (2006.01) |
| *F16F 9/512* | (2006.01) |
| *F16J 15/16* | (2006.01) |
| *F16J 15/32* | (2016.01) |
| *B60G 17/08* | (2006.01) |
| *F16F 9/19* | (2006.01) |

(52) U.S. Cl.
CPC ........... *F16F 9/5126* (2013.01); *F16J 15/162* (2013.01); *F16J 15/32* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/11* (2013.01); *B60G 2600/21* (2013.01); *B60G 2800/162* (2013.01); *B60G 2800/916* (2013.01); *F16F 9/19* (2013.01); *F16F 2222/12* (2013.01); *F16F 2228/066* (2013.01); *F16F 2230/04* (2013.01); *F16F 2230/30* (2013.01); *F16F 2230/42* (2013.01)

(58) Field of Classification Search
CPC ...... F16F 2230/04; F16F 9/19; F16F 2222/12; F16F 2228/066; F16F 2230/30; F16F 2230/42; B60G 13/08; B60G 17/08; B60G 2202/24; B60G 2204/62; B60G 2206/41; B60G 2500/11; B60G 2600/21; B60G 2800/162; B60G 2800/916; F16J 15/162; F16J 15/32; F16J 15/3216; F16J 15/56; F16J 15/18
See application file for complete search history.

(56) References Cited

U.S. PATENT DOCUMENTS

| | | | | |
|---|---|---|---|---|
| 3,143,757 | A * | 8/1964 | Quinn | E05F 3/108 |
| | | | | 188/317 |
| 3,260,275 | A * | 7/1966 | Armstrong | G05D 16/106 |
| | | | | 251/63 |
| 3,268,235 | A * | 8/1966 | Jacobellis | F16J 15/3208 |
| | | | | 277/910 |
| 3,608,911 | A * | 9/1971 | Prasse | F16J 9/06 |
| | | | | 277/455 |
| 3,663,024 | A * | 5/1972 | Traub | F16J 15/3208 |
| | | | | 277/910 |
| 3,678,809 | A * | 7/1972 | Doutt | F04B 53/143 |
| | | | | 92/244 |
| 3,771,801 | A * | 11/1973 | Burke | F16J 15/32 |
| | | | | 277/944 |
| 3,814,445 | A * | 6/1974 | Bitzan | F16J 15/32 |
| | | | | 277/589 |
| 3,828,897 | A * | 8/1974 | Nandyal | F16J 15/32 |
| | | | | 277/467 |
| 4,089,534 | A * | 5/1978 | Litherland | F16J 15/32 |
| | | | | 277/572 |
| 4,151,999 | A * | 5/1979 | Ringel | F16J 15/32 |
| | | | | 277/589 |
| 4,179,131 | A * | 12/1979 | Nussbaumer | F16J 15/32 |
| | | | | 277/589 |
| 4,244,280 | A * | 1/1981 | Stoll | F16J 15/32 |
| | | | | 92/159 |
| 4,523,765 | A * | 6/1985 | Heidemann | F16J 15/3208 |
| | | | | 277/587 |
| 4,577,874 | A * | 3/1986 | Zitting | F16J 15/3208 |
| | | | | 277/584 |
| 4,632,228 | A * | 12/1986 | Oster | A47C 3/30 |
| | | | | 188/300 |
| 4,635,908 | A * | 1/1987 | Ludwig | F16F 9/368 |
| | | | | 267/129 |
| 4,735,402 | A * | 4/1988 | Davis | F16F 9/3405 |
| | | | | 92/9 |
| 4,749,202 | A * | 6/1988 | Bonomi | F16J 15/32 |
| | | | | 277/468 |
| 4,865,368 | A * | 9/1989 | McCall | E05B 65/5292 |
| | | | | 150/101 |
| 4,889,349 | A * | 12/1989 | Muller | F16J 15/3208 |
| | | | | 277/572 |
| 5,135,238 | A * | 8/1992 | Wells | F16J 15/183 |
| | | | | 277/514 |
| 5,143,382 | A * | 9/1992 | Maringer | F16J 15/164 |
| | | | | 277/584 |
| 5,183,271 | A * | 2/1993 | Wada | F16J 15/3244 |
| | | | | 277/575 |
| 5,261,677 | A * | 11/1993 | Gotoh | F16J 15/024 |
| | | | | 277/549 |
| 5,328,177 | A * | 7/1994 | Lair | F16J 15/3208 |
| | | | | 277/584 |
| 5,520,092 | A * | 5/1996 | Iida | F16F 9/368 |
| | | | | 92/155 |
| 5,579,718 | A * | 12/1996 | Freerks | F16K 51/02 |
| | | | | 118/733 |
| 6,036,191 | A * | 3/2000 | Millard | B62D 5/083 |
| | | | | 277/411 |
| 6,176,492 | B1 * | 1/2001 | Sawai | F16J 9/06 |
| | | | | 188/322.18 |
| 6,217,030 | B1 * | 4/2001 | Zitting | F16J 15/3208 |
| | | | | 277/435 |
| 6,283,478 | B1 * | 9/2001 | Kumai | F16J 9/28 |
| | | | | 277/435 |
| 6,523,833 | B1 * | 2/2003 | Ishigaki | F16J 15/062 |
| | | | | 277/551 |
| 7,370,866 | B2 * | 5/2008 | Zitting | F16J 15/56 |
| | | | | 277/467 |
| 8,181,972 | B2 * | 5/2012 | Tsuji | F16K 51/02 |
| | | | | 277/644 |
| 8,522,935 | B2 * | 9/2013 | Cadeddu | B60T 11/21 |
| | | | | 277/587 |
| 8,746,423 | B2 * | 6/2014 | Maeda | F16F 9/19 |
| | | | | 277/587 |
| 9,127,771 | B2 * | 9/2015 | Okuma | F16J 15/3284 |
| 9,309,945 | B2 * | 4/2016 | Maeda | F16F 9/19 |
| 9,314,864 | B2 * | 4/2016 | Budd | B23K 3/0607 |
| 9,388,902 | B2 * | 7/2016 | Sueyoshi | F16J 15/166 |
| 10,480,605 | B2 * | 11/2019 | Ruhlman | F16F 9/368 |
| 10,900,568 | B2 * | 1/2021 | Arikawa | F16F 9/368 |
| 11,359,722 | B2 * | 6/2022 | Maheshwari | F16J 15/022 |
| 11,898,640 | B2 * | 2/2024 | Brand | F16J 15/56 |
| 2009/0289418 | A1 * | 11/2009 | Cook | F16J 15/3268 |
| | | | | 277/549 |
| 2010/0301578 | A1 | 12/2010 | Noda et al. | |
| 2011/0214955 | A1 * | 9/2011 | Maeda | F16F 9/34 |
| | | | | 188/280 |
| 2014/0326556 | A1 * | 11/2014 | Ruhlman | F16F 9/368 |
| | | | | 188/322.18 |
| 2015/0013799 | A1 | 1/2015 | Sarai et al. | |
| 2015/0345584 | A1 * | 12/2015 | Fukushima | F16F 9/3482 |
| | | | | 188/322.15 |
| 2017/0159821 | A1 * | 6/2017 | Jordan | F15B 15/1452 |
| 2018/0259026 | A1 * | 9/2018 | Shimozaki | F16F 9/368 |
| 2018/0355941 | A1 * | 12/2018 | Yuno | F16F 9/461 |
| 2019/0154151 | A1 * | 5/2019 | Arikawa | F15B 15/14 |
| 2019/0249739 | A1 * | 8/2019 | Tomita | F16F 9/00 |
| 2019/0368569 | A1 * | 12/2019 | Yamashita | F16F 9/348 |
| 2020/0032871 | A1 * | 1/2020 | Yamashita | F16F 9/3221 |
| 2020/0072284 | A1 * | 3/2020 | Kanzaki | F16C 33/7823 |
| 2022/0412428 | A1 * | 12/2022 | Yamashita | F16F 9/512 |
| 2023/0279920 | A1 * | 9/2023 | Kotani | F16F 9/3485 |
| | | | | 188/269 |

FOREIGN PATENT DOCUMENTS

| | | | |
|---|---|---|---|
| JP | 2006-038051 A | 2/2006 |
| JP | 2006-046446 A | 2/2006 |
| JP | 2007-245940 A | 9/2007 |
| JP | 2008-298225 A | 12/2008 |
| JP | 2010-276102 A | 12/2010 |
| JP | 2015-017514 A | 1/2015 |
| JP | 2015-197176 A | 11/2015 |

(56)        References Cited

FOREIGN PATENT DOCUMENTS

| | | | |
|---|---|---|---|
| JP | 2016-191425 A | 11/2016 | |
| JP | 2017-096453 A | 6/2017 | |
| JP | 2017-150509 A | 8/2017 | |
| JP | 2018-003853 A | 1/2018 | |
| WO | WO 2020/241422 A1 | 12/2020 | |
| WO | WO-2020261683 A1 * | 12/2020 | ............. F16F 9/348 |

OTHER PUBLICATIONS

Oct. 22, 2024, Japanese Office Action issued for related JP Application No. 2020-208877.
Sep. 2, 2025, Japanese Office Action issued for related JP Application No. 2020-208877.
Sep. 26, 2025, Chinese Office Action Issued for related CN Application No. 202180073115.1.

* cited by examiner

SEALING DEVICE AND DAMPER FOR HYDRAULIC EQUIPMENT

CROSS REFERENCE TO PRIOR APPLICATION

This application is a National Stage Patent Application of PCT International Patent Application No. PCT/JP2021/043946 (filed on Nov. 30, 2021) under 35 U.S.C. § 371, which claims priority to Japanese Patent Application No. 2020-208877 (filed on Dec. 17, 2020), which are all hereby incorporated by reference in their entirety.

TECHNICAL FIELD

The present invention relates to a sealing device and a damper for hydraulic equipment.

BACKGROUND ART

A sealing device for hydraulic equipment is employed in hydraulic equipment such as a damper interposed between a vehicle body and a wheel and configured to exert a damping force to suppress vibrations of the vehicle body and the wheel and a cylinder device configured to drive a boom or an arm of a construction machine.

As disclosed in JP 2017-96453 A, a sealing device applied to a damper includes a seal ring which seals a gap between a primary piston splitter and a secondary piston splitter in a piston including two valve bodies of the primary piston splitter and the secondary piston splitter held by a nut on the outer circumference of a rod.

The piston is provided with a passage for communicating an extension side chamber and a compression side chamber inside a cylinder partitioned by the piston. Furthermore, two leaf valves for opening and closing the passage are attached to the corresponding primary piston splitter and the secondary piston splitter.

The seal ring is fitted into a tubular portion protruding from the secondary piston splitter and housed in an annular groove disposed circumferentially along the outer circumference of the disk-like primary piston splitter which closes the tubular portion, and the seal ring adheres closely to the inner circumference of the tubular portion so as to seal the gap between the primary piston splitter and the secondary piston splitter.

According to the sealing device with this configuration, the seal ring prevents hydraulic oil from bypassing the valves and from passing through the gap between the primary piston splitter and the secondary piston splitter, thereby enabling the damper to exert a damping force as designed.

CITATION LIST

Patent Literature

Patent Literature 1: JP 2017-96453 A

SUMMARY OF INVENTION

Technical Problem

As described above, in order for a sealing device to seal a gap between a primary piston splitter and a secondary piston splitter, an annular groove is to be disposed in the outer circumference of the primary piston splitter fitted into a tubular portion of the secondary piston splitter, and the primary piston splitter is to be inserted into the tubular portion after a seal ring is housed in the annular groove.

In order to prevent the seal ring from falling off the annular groove, it is profoundly important that the seal ring is designed to have an inside diameter smaller than an outside diameter of a part in the primary piston splitter which is fitted into the tubular portion and that the seal ring is enlarged in diameter when being placed in the annular groove.

In order for the seal ring to appropriately seal the gap between the primary piston splitter and the secondary piston splitter, the seal ring is to be strongly pressed against the tubular portion of the secondary piston splitter and designed to have an outside diameter larger than an inside diameter of the tubular portion, so that the seal ring is inserted into the tubular portion in a compressed state. Therefore, the insertion of the primary piston splitter equipped with the seal ring into the tubular portion of the secondary piston splitter accompanies the compression of the seal ring.

The seal ring is formed, for example, by vulcanized rubber. However, a hard material is occasionally employed from a durability perspective as well as perspectives of preventing the seal ring from falling off the annular groove and ensuring a pressing force against the tubular portion, and the use of a hard material imposes a heavy burden on an operator when placing the seal ring in the annular groove and fitting the primary piston splitter into the tubular portion.

In order to reduce the burden on an operator and to enhance ease of operation, there is an attempt to reduce a frictional force created between a seal ring and a primary piston splitter or a tubular portion by providing the seal ring with self-lubricating properties or by performing surface treatment on the seal ring.

However, reducing a frictional force created between a seal ring and a primary piston splitter or a tubular portion by such treatment on the seal ring promotes axial displacement of the seal ring within an annular groove, and even low pressure from an extension side chamber or a compression side chamber may displace the seal ring within the annular groove.

For this reason, when a damper is activated at an extremely low speed, the seal ring moves within the annular groove and causes a change in passage capacity corresponding to a distance through which the seal ring moves, thereby producing an effect as in a condition where hydraulic oil in an amount corresponding to the change in capacity apparently bypasses leaf valves and passes through a gap between the primary piston splitter and secondary piston splitter.

Such an effect becomes the cause of reduction in amount of hydraulic oil passing through the leaf valves when the damper extends or contracts at an extremely low speed, and the damper becomes less able to exert a damping force as intended, which causes a time delay in generating a damping force.

Even in a case where the outer circumference of a piston is provided with an annular groove and a seal ring slidably in contact with a cylinder along which the piston slides is housed in the annular groove, displacement of the seal ring produces an effect as in a condition where hydraulic oil apparently bypasses valves and passes through a gap between the cylinder and the piston. In a case where a gas chamber is disposed in the cylinder by a free piston and a seal ring slidably in contact with the cylinder is housed in the outer circumference of the free piston, displacement of the seal ring within the annular groove reduces an amount of hydraulic oil passing through the valves. Even in a cylinder device instead of a damper, when hydraulic oil is supplied to a cylinder, displacement of a seal ring apparently hinders the supply of hydraulic oil into the cylinder corresponding to a distance through which the seal ring moves, thereby causing a time delay in generating thrust in the cylinder device.

As described above, in a sealing device in hydraulic equipment such as a damper and a cylinder device, reducing a frictional force of a seal ring in order to enhance ease of placing the seal ring and ease of assembling hydraulic equipment creates a disadvantage of time delay in generating a damping force or thrust in hydraulic equipment.

Solution to Problem

An object of the invention is to provide a sealing device capable of enhancing ease of assembly while preventing a time delay in generating a damping force or thrust in hydraulic equipment and to provide a damper capable of enhancing ease of assembly while preventing a time delay in generating a damping force.

In order to solve the problems, the sealing device for hydraulic equipment according to the invention includes an outer member having an annular shape, an inner member inserted into the outer member, and a seal ring housed in an annular groove disposed in one of the outer member and the inner member and abutting on the other of the outer member and the inner member to prevent a liquid from passing through a gap between the outer member and the inner member. The annular groove disposed in one of the outer member and the inner member has a bottom portion including a recess or a recess and protrusion for restraining axial displacement of the seal ring relative to the annular groove. According to the sealing device for hydraulic equipment with this configuration, it is possible to regulate the axial displacement of the seal ring within the annular groove. Accordingly, it is possible to prevent a phenomenon of a liquid apparently passing through the gap between the outer member and the inner member due to the displacement of the seal ring within the annular groove.

DESCRIPTION OF EMBODIMENTS

Figure 1:
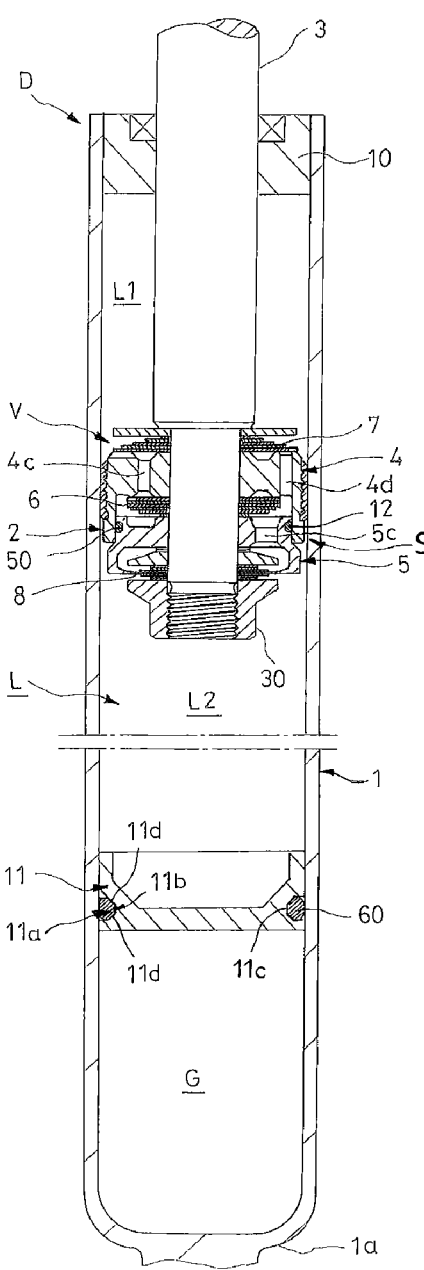
FIG. 1 is a longitudinal sectional view of a damper to which a sealing device for hydraulic equipment according to an embodiment is applied.
Figure 2:
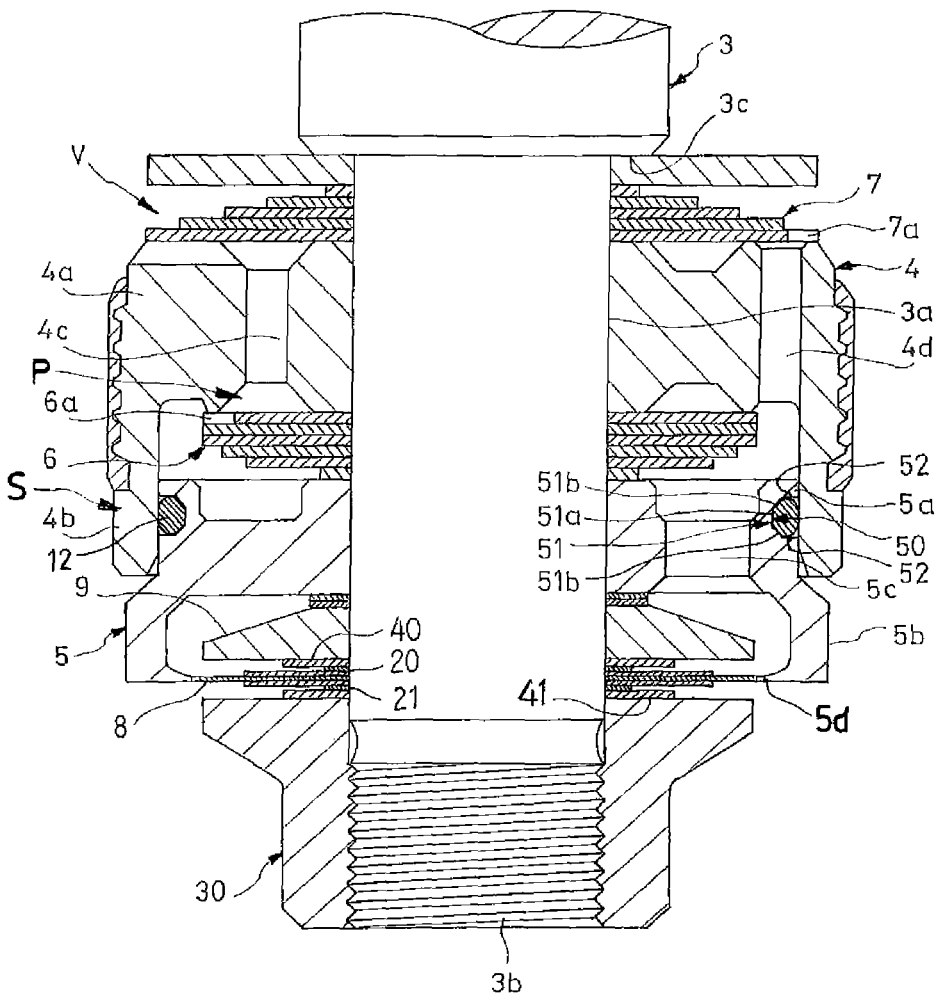
FIG. 2 is an enlarged sectional view of a piston in the damper to which the sealing device for hydraulic equipment according to the embodiment is applied.

Hereinafter, the invention will be described based on embodiments illustrated in drawings. As illustrated in FIGS. 1 and 2, a sealing device S for hydraulic equipment according to an embodiment is applied to a damper D as hydraulic equipment. The damper D is provided with a cylinder 1, a piston 2 inserted into the cylinder 1 while being axially movable and including a passage P which partitions the interior of the cylinder 1 into two hydraulic chambers, that is, an extension side chamber L1 and a compression side chamber L2, and communicates the extension side chamber L1 and the compression side chamber L2, a rod 3 inserted into the cylinder 1 while being axially movable, a valve V configured to open and close the passage P, and a sealing device S. The damper D according to this embodiment is interposed between a vehicle body and an axle in a vehicle (not illustrated) in order to suppress vibrations of the vehicle body and a wheel. Note that an object where the damper D provided with the sealing device S according to the invention is installed is not limited to a vehicle and may be changed in an appropriate manner. The damper D illustrated in FIG. 1 may be turned upside down depending on the object.

Next, specific structures of the sealing device S and the damper D provided with the sealing device S will be described. As illustrated in FIG. 1, the cylinder 1 has a bottomed tubular shape, including an annular rod guide 10 attached to the inner circumference of an upper end of the cylinder 1, and the rod 3 is slidably inserted into this rod guide 10. This configuration makes the interior of the cylinder 1 a sealed space.

The rod 3 has an upper end provided with a bracket (not illustrated), and the rod 3 is connected to one of the vehicle body and the axle through the bracket. The cylinder 1 has a bottom portion 1a also provided with a bracket (not illustrated), and the cylinder 1 is connected to the other of the vehicle body and the axle through the bracket.

The damper D is interposed between the vehicle body and the axle in this manner. When the vehicle travels on a bumpy road, for example, and the wheel vibrates up and down relative to the vehicle body, the piston 2 moves up and down (axially) inside the cylinder 1 along with the rod 3 getting in and out of the cylinder 1 to extend and contract the damper D.

Furthermore, a free piston 11 is slidably inserted into the cylinder 1 on the opposite side of the rod 3 as viewed from the piston 2 inside the cylinder 1. The free piston 11 partitions the interior of the cylinder 1 into a liquid chamber L filled with a liquid such as hydraulic oil and a gas chamber G filled with a gas. In addition, the axially movable piston 2 inserted into the cylinder 1 partitions the liquid chamber L into two hydraulic chambers, that is, the extension side chamber L1 illustrated in the upper side of FIG. 1 and the compression side chamber L2 illustrated in the lower side of FIG. 1. The gas chamber G is filled with a compressed gas. Note that the damper D may use not only hydraulic oil but also other liquids such as water and an aqueous solution. A gas filled in the gas chamber G is preferably an inert gas such as nitrogen gas but may be other gases.

As illustrated in FIGS. 1 and 2, the rod 3 includes a small-diameter portion 3a, a screwed portion 3b, and a stepped portion 3c and is inserted into the cylinder 1 through the rod guide 10 while being axially movable. The small-diameter portion 3a is formed by reducing an outside diameter of a lower part of the rod 3, and the piston 2 is attached to the outer circumference of the small-diameter portion 3a. The screwed portion 3b is formed on the outer circumference of the tip of the small-diameter portion 3a. The stepped portion 3c is formed at the boundary between the rod 3 and the small-diameter portion 3a.

When the damper D extends, the rod 3 gets out of the cylinder 1 and the cylinder capacity increases to an extent corresponding to a volume of the rod 3 pulled out of the cylinder 1, which allows the free piston 11 to move upward inside the cylinder 1, whereby the gas chamber G is expanded. In contrast, when the damper D contracts, the rod 3 gets in the cylinder 1 and the cylinder capacity decreases to an extent corresponding to a volume of the rod 3 entering into the cylinder 1, which allows the free piston 11 to move downward inside the cylinder 1, whereby the gas chamber G is contracted. As described above, the damper D as hydraulic equipment according to this embodiment is a monotube damper with a single rod, being configured to expand and contract the gas chamber G by motions of the free piston 11 at the time of extension and contraction so as to compensate the volume of the rod 3 getting in and out of the cylinder 1. Note that the liquid chamber L and the gas chamber G may be partitioned by a bladder or a bellows instead of the free piston 11.

Instead of forming the gas chamber G by the free piston 11, an outer shell may be disposed on the outer circumference of the cylinder 1 to form a reservoir filled with a liquid and a gas between the cylinder 1 and the outer shell, and the volume of the rod 3 getting in and out of the cylinder 1 may be compensated by the reservoir. In addition to the outer shell disposed on the outer circumference of the cylinder 1, a tank may be employed independently of the cylinder 1 provided with the reservoir. Alternatively, the damper D may be a double-rod damper provided with a rod on both sides of the piston.

The piston 2 includes a primary piston splitter 4 as an outer member and a secondary piston splitter 5 as an inner member held by a nut 30 on the outer circumference of the rod 3. The primary piston splitter 4 includes primary valve bodies 6 and 7 stacked thereon, and the secondary piston splitter 5 includes a secondary valve body 8 attached thereto. The primary valve bodies 6 and 7 and the secondary valve body 8 constitute the valve V.

As illustrated in FIG. 2, the primary piston splitter 4 constitutes the outer member of the sealing device S, including an annular main body 4a and a tubular portion 4b protruding downward from an outer circumferential portion of a lower end of this main body 4a. The main body 4a is provided with an extension side passage 4c and a compression side passage 4d which are opened on the side closer to the inner circumference of the tubular portion 4b and configured to axially penetrate the main body 4a. Furthermore, a lower part of the main body 4a (closer to the compression side chamber L2) has the extension side primary valve body 6 for opening and closing the extension side passage 4c stacked thereon, and an upper part of the main body 4a (closer to the extension side chamber L1) has the compression side primary valve body 7 for opening and closing the compression side passage 4d stacked thereon.

The extension side and compression side primary valve bodies 6 and 7 in the damper D according to this embodiment are stacked leaf valves in which a plurality of elastically deformable leaf valves is stacked. The number of leaf valves in the primary valve bodies 6 and 7 is optionally changeable depending on a desired damping force.

When the damper D extends while the piston speed is in the medium- or high-speed range, the extension side primary valve body 6 opens and offers resistance to a liquid flowing through the extension side passage 4c from the extension side chamber L1 to the compression side chamber L2. In contrast, when the damper D contracts while the piston speed is in the medium- or high-speed range, the compression side primary valve body 7 opens and offers resistance to a liquid flowing through the compression side passage 4d from the compression side chamber L2 to the extension side chamber L1.

Among the plurality of leaf valves included in the extension side and compression side primary valve bodies 6 and 7, the leaf valves closest to the primary piston splitter 4 have outer circumferential portions respectively provided with cutouts 6a or 7a. When the piston speed is in the low-speed range and the extension side and compression side primary valve bodies 6 and 7 are closed, a liquid passes through orifices formed by the cutouts 6a and 7a and moves back and forth between the extension side chamber L1 and the compression side chamber L2. The orifices (cutouts 6a and 7a) offer resistance to a flow of this liquid.

The orifices formed by the cutouts 6a and 7a allow a bidirectional flow of the liquid. One of the cutouts 6a and 7a disposed in the extension side and compression side primary valve bodies 6 and 7 may be omitted. A method for forming an orifice may be changed in an appropriate manner. For example, an orifice may be formed by punching a valve seat where the extension side primary valve body 6 or the compression side primary valve body 7 is separated or seated. Alternatively, a choke may be used as a substitute for the orifice. Furthermore, the primary valve bodies 6 and 7 which are attached to the primary piston splitter 4 and cause the damper D to generate a damping force in the medium- or high-speed range are not necessarily the stacked leaf valves and may be poppet valves.

As illustrated in FIG. 2, the secondary piston splitter 5 constitutes the inner member, including a fitting portion 5a, a casing portion 5b, a communication passage 5c, and an annular groove 50. The fitting portion 5a has an annular shape, being fitted into the inner circumference of the tubular portion 4b of the primary piston splitter 4. The casing portion 5b has a tubular shape, protruding downward from an outer circumferential portion of a lower end of the fitting portion 5a. The communication passage 5c axially penetrates the fitting portion 5a, being opened on the side closer to the inner circumference of the casing portion 5b. The annular groove 50 is disposed circumferentially along the outer circumference of the fitting portion 5a. The annular groove 50 on the outer circumference of the fitting portion 5a houses a seal ring 12 which abuts on the inner circumference of the tubular portion 4b of the primary piston splitter 4 as the outer member and seals a gap between the primary piston splitter 4 and the secondary piston splitter 5.

Figure 3:
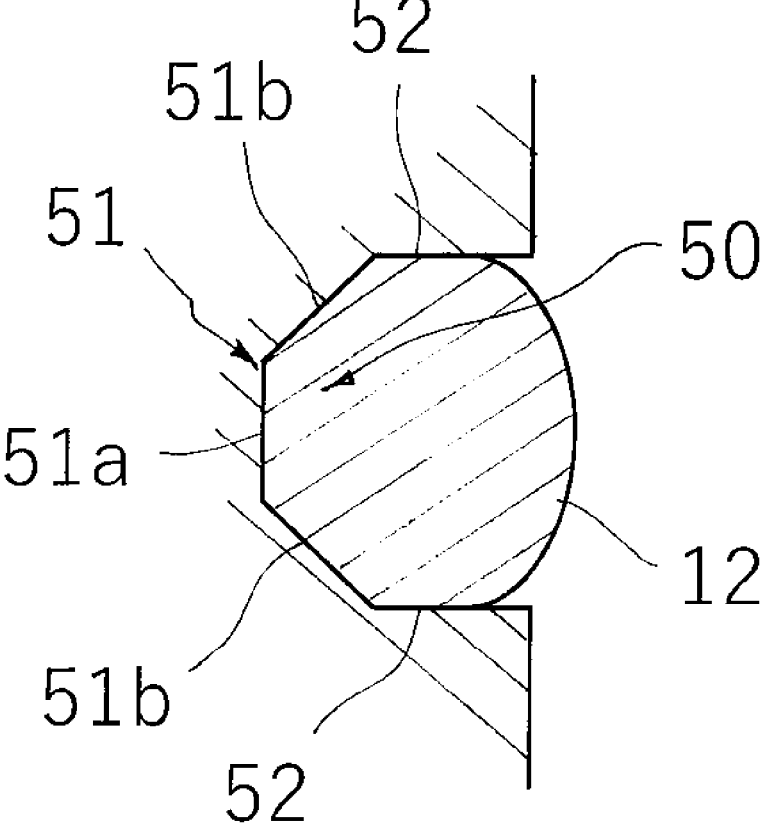
FIG. 3 is an enlarged sectional view of a part of the piston in the damper to which the sealing device for hydraulic equipment according to the embodiment is applied.

As illustrated in FIG. 3, the annular groove 50 in the secondary piston splitter 5 is disposed circumferentially along the entire outer circumference of the fitting portion 5a and is formed into a recessed groove which is surrounded by a bottom portion 51 and a pair of side walls 52 and 52 stretching axially in parallel from both ends of the bottom portion 51 to face each other.

Furthermore, as illustrated in FIG. 3, the bottom portion 51 includes a bottom surface 51a in a midsection in FIG. 3 and tapered surfaces 51b and 51b, forming one recess as a whole. The bottom surface 51a has a maximum recess depth, and the tapered surfaces 51b and 51b are respectively continuous with upper and lower parts of the bottom surface 51a and get gradually shallower toward the side walls 52.

The annular groove 50 having this configuration houses the seal ring 12 composed of an O-ring. The seal ring 12 is formed of rubber or the like mixed with a lubricant and has self-lubricating properties. In addition, the seal ring 12 is subjected to surface treatment to have a smooth surface, which reduces a frictional force between the seal ring 12 and other components. Rubber having self-lubricating properties is obtained by mixing a lubricant into base material rubber as described above. As the base material rubber, any rubber used for sealing may be employed. Examples of such rubber include fluororubber, ethylene-propylene-diene terpolymer rubber, acrylic rubber, acrylonitrile-butadiene rubber, and hydrogenated acrylonitrile-butadiene rubber. With regard to the lubricant mixed in the base material rubber, any material bled from the base material rubber and having lubricating properties may be employed. Examples of the material include silicone oil, modified silicone oil, and other oils, paraffin wax and other waxes and also include fatty acids, fatty acid salts, and fatty acid amides.

The seal ring 12 has an inside diameter smaller than the minimum outside diameter of the bottom portion 51 of the annular groove 50 and is housed in the annular groove 50 while having the diameter enlarged. Due to its self-restoring force, the seal ring 12 contracts, thereby entering and adhering closely to the recessed inner circumference of the bottom portion 51. Furthermore, the seal ring 12 is designed to have an outside diameter larger than an outside diameter of the fitting portion 5a when the seal ring 12 is housed in the annular groove 50.

When the fitting portion 5a of the secondary piston splitter 5 is inserted into the tubular portion 4b of the primary piston splitter 4, the seal ring 12 is compressed by the tubular portion 4b and decreases in outside diameter. Due to its self-restoring force, the seal ring 12 presses the inner circumferential surface of the tubular portion 4b and adheres closely to the inner circumference of the tubular portion 4b. Accordingly, the inner circumference of the seal ring 12 enters into the bottom portion 51 of the annular groove 50 and tightens the bottom portion 51, while the outer circumference of the seal ring 12 adheres strongly and closely to the tubular portion 4b, thereby sealing the gap between the primary piston splitter 4 and the secondary piston splitter 5. Furthermore, since the bottom portion 51 of the annular groove 50 in the sealing device S according to this embodiment is shaped into a recess, the inner circumference of the seal ring 12 enters and fits into the bottom portion 51 and is restrained by the bottom portion 51. For this reason, even when pressure acts on the seal ring 12 from an upper part or lower part of FIG. 3, the position of the seal ring 12 is determined in the midsection of the annular groove 50, and the seal ring 12 is prevented from deviating in axial direction, or up-down direction. Since the bottom portion 51 includes the tapered surfaces 51b and 51b, the seal ring 12 easily enters into the recess along the tapered surfaces 51b and 51b, and the inner circumference of the seal ring 12 is restrained by the bottom portion 51, whereby a positional deviation of the seal ring 12 in the axial direction is efficiently prevented.

In addition, the casing portion 5b in the secondary piston splitter 5 has the tip provided with an annular opposing portion 5d protruding radially inward from the inner circumference of the casing portion 5b. Furthermore, two stoppers 9 and 40 having different outside diameters are housed in the casing portion 5b. Still further, on a lower part of the stopper 40 illustrated in FIG. 2, the secondary valve body 8 and a stopper 41 are stacked.

As illustrated in FIG. 2, the secondary valve body 8 according to this embodiment includes three stacked leaf valves. The middle leaf valve is larger than the upper and lower leaf valves in outside diameter. A spacer 20 is interposed between the upper leaf valve and the stopper 40 immediately above the leaf valve, and a spacer 21 is interposed between the lower leaf valve and the stopper 41 immediately below the leaf valve.

Following the primary valve body 7, the primary piston splitter 4, the primary valve body 6, and the secondary piston splitter 5, the stoppers 9 and 40, the spacer 20, the secondary valve body 8, the spacer 21, and the stopper 41 are attached to the outer circumference of the small-diameter portion 3a of the rod 3 in order and are fixed to the small-diameter portion 3a of the rod 3 together with the primary valve body 7, the primary piston splitter 4, the primary valve body 6, and the secondary piston splitter 5 by being sandwiched between the stepped portion 3c and the nut 30 screwed into the screwed portion 3b. The fitting portion 5a of the secondary piston splitter 5 is inserted into the tubular portion 4b of the primary piston splitter 4, and the extension side passage 4c and the compression side passage 4d abutting on the extension side chamber L1 are communicated with the compression side chamber L2 through the communication passage 5c and the casing portion 5b. With this configuration, the passage P disposed in the piston 2 is formed inside the extension side passage 4c, the compression side passage 4d, the communication passage 5c, and the casing portion 5b. Since the seal ring 12 within the annular groove 50 adheres closely to the inner circumference of the tubular portion 4b and seals the gap between the tubular portion 4b of the primary piston splitter 4 and the fitting portion 5a of the secondary piston splitter 5, the sealing device S prevents a liquid from passing through the gap between tubular portion 4b and the fitting portion 5a except for the passage P.

Each of the spacers 20 and 21 is an annular plate having an outside diameter smaller than that of each leaf valve included in the secondary valve body 8. The secondary valve body 8 is fixed to the secondary piston splitter 5 while having the inner circumference sandwiched by the spacers 20 and 21. Parts of the secondary valve body 8 on the outer side of the spacers 20 and 21 move up and down (axially) using abutting portions between the spacers 20, 21 and the secondary valve body 8 as fulcrums.

As described above, in this embodiment, the inner circumference of the secondary valve body 8 attached to the secondary piston splitter 5 is a fixed end which does not move relative to the secondary piston splitter 5. Furthermore, the outer circumference of the secondary valve body 8 is a free end which moves up and down (both sides in the axial direction) relative to the secondary piston splitter 5 when the secondary valve body 8 deflects. While the inner circumference of the secondary valve body 8 is fixed to the secondary piston splitter 5, the outer circumference of the middle leaf valve having the largest outside diameter in the secondary valve body 8 faces the opposing portion 5d disposed in the inner circumference of the casing portion 5b in the secondary piston splitter 5, having an extremely short-width annular gap interposed therebetween.

In an extremely low-speed range where the piston speed is close to zero, or when the damper D starts to work, the secondary valve body 8 does not deflect, and the free end of the secondary valve body 8 faces the opposing portion 5d across the annular gap. In this embodiment, the annular gap between the opposing portion 5d and the free end of the secondary valve body 8 facing each other is very narrow, and a flow passage area in the annular gap is designed to be smaller than a flow passage area of all the orifices formed by the cutouts 6a and 7a in the primary valve bodies 6 and 7.

In contrast, when the damper D extends or contracts while the piston speed is in the low-speed range or in the medium- or high-speed range, the secondary valve body 8 deflects upward or downward and increases the annular gap between the opposing portion 5d and the free end of the secondary valve body 8 shifted upward or downward, thereby making the flow passage area in the annular gap larger than the flow passage area of the orifices formed by the cutouts 6a and 7a.

When the secondary valve body 8 deflects upward or downward, an increase in deflection amount causes a radially intermediate portion of the secondary valve body 8 to abut on and be supported by the stopper 40 or stopper 41. A further increase in deflection amount of the secondary valve body 8 causes the middle leaf valve in the secondary valve body 8 to abut on an outer circumferential edge of the stopper 9 or nut 30, thereby preventing the secondary valve body 8 from deflecting further.

In this manner, when the deflection of the secondary valve body 8 is promoted, the middle leaf valve of the secondary valve body 8 abuts on the stopper 9 or nut 30 while the radially intermediate portion is supported by the stopper 40 or stopper 41, so that the secondary valve body 8 is prevented from deflecting further. Accordingly, when the secondary valve body 8 deflects to the maximum extent, the secondary valve body 8 curves in such a manner that the inclination gradually increases toward the free end, which reduces stress around the deflection fulcrums of the secondary valve body 8 and enhances the durability of the secondary valve body 8.

Furthermore, in this embodiment, in the initial state where the secondary valve body 8 is not deflected, the free end has a diameter larger than an outside diameter of the stopper 9 and an outside diameter of a part of the nut 30 closer to the secondary valve body 8. For this reason, when the secondary valve body 8 abuts on the stopper 9 or nut 30, a gap between the stopper 9 or nut 30 and the opposing portion 5d becomes smaller than the annular gap between the free end of the secondary valve body 8 and the opposing portion 5d and prevents the reduction of a liquid flow. Note that the secondary valve body 8 may have any configuration as long as it includes at least one leaf valve and that the leaf valve on which each supporting portion abuts may be changed in an appropriate manner.

Hereinafter described is an operation of the damper D provided with the damping valve (valve) V according to this embodiment.

When the damper D extends, the piston 2 moves upward inside the cylinder 1 and compresses the extension side chamber L1, and a liquid in this extension side chamber L1 passes through the passage P and moves to the compression side chamber L2. With respect to a flow of the liquid, the extension side primary valve body 6, the orifice formed by the cutout 6a or 7a of the primary valve body 6 or 7, or the secondary valve body 8 offers resistance to increase pressure of the extension side chamber L1, thereby enabling the damper D to exert an extension side damping force that prevents extension operation.

In contrast, when the damper D contracts, the piston 2 moves downward inside the cylinder 1 and compresses the compression side chamber L2, and a liquid in this compression side chamber L2 passes through the passage P and moves to the extension side chamber L1. With respect to a flow of the liquid, the compression side primary valve body 7, the orifice formed by the cutout 6a or 7a of the primary valve body 6 or 7, or the secondary valve body 8 offers resistance to increase pressure of the compression side chamber L2, thereby enabling the damper D to exert a compression side damping force that prevents contraction operation.

In this embodiment, the extension side and compression side primary valve bodies 6 and 7 are opened according to the piston speed or the outer circumferential portion (free end) of the secondary valve body 8 deflects upward or downward so as to enable the damper D to exert a speed-dependent damping force depending on the piston speed.

More specifically, when the piston speed is in the extremely low-speed range close to zero, the extension side and compression side primary valve bodies 6 and 7 are closed, and the secondary valve body 8 does not deflect and the free end faces the opposing portion 5d.

When the damper D extends while the piston speed is in the extremely low-speed range, a liquid passes through the cutouts 6a and 7a of the extension side and compression side primary valve bodies 6 and 7 and flows from the extension side chamber L1 to the tubular portion 4b, and flows downward through the communication passage 5c in FIG. 2, and then, flows in the compression side chamber L2 from the annular gap between the free end of the secondary valve body 8 and the opposing portion 5d facing each other.

In contrast, when the damper D contracts while the piston speed is in the extremely low-speed range, a liquid flows in the casing portion 5b from the compression side chamber L2 through the annular gap between the free end of the secondary valve body 8 and the opposing portion 5d facing each other, and then, flows upward in FIG. 2 through the casing portion 5b and the communication passage 5c toward the extension side chamber L1 via the cutouts 6a and 7a of the extension side and compression side primary valve bodies 6 and 7.

As described above, since the annular gap between the free end of the secondary valve body 8 and the opposing portion 5d facing each other has a very small opening area, when the piston speed is in the extremely low-speed range, the damper D exerts a damping force in the extremely low-speed range attributed to resistance when a liquid flows in the annular gap.

When the damper D extends or contracts at an extremely low speed, an amount of liquid passing through the passage P is extremely small. In this state, when the seal ring 12 for sealing the gap between the primary piston splitter 4 and the secondary piston splitter 5 moves axially within the annular groove 50, an amount of liquid passing through the annular gap between the secondary valve body 8 and the opposing portion 5d is reduced by a distance through which the seal ring 12 moves. In other words, the gap between the primary piston splitter 4 and the secondary piston splitter 5 is sealed by the seal ring 12, but the axial displacement of the seal ring 12 within the annular groove 50 produces an effect as in a condition where the liquid apparently passes through the gap between the primary piston splitter 4 and the secondary piston splitter 5. Reduction in amount of liquid passing through the annular gap causes reduction in rate of flow passing through the annular gap, which causes a time delay in generating a damping force of the damper D. However, in the sealing device S in the damper D according to this embodiment, the bottom portion 51 in the annular groove 50 is formed into a recess as a whole, and the seal ring 12 enters into the deepest part of the bottom portion 51 by its own tightening force, and the inner circumference of the seal ring 12 is restrained by the bottom portion 51, which prevents the axial displacement of the seal ring 12 relative to the annular groove 50. In this manner, the inner circumference of the seal ring 12 is restrained and the axial displacement within the annular groove 50 is regulated. Accordingly, even though the seal ring 12 has self-lubricating properties and is subjected to surface treatment to create a reduced frictional force, the seal ring 12 does not move axially within the annular groove 50, thereby preventing a time delay in generating a damping force of the damper D.

When the piston speed increases and gets in the low-speed range from the extremely low-speed range, the extension side and compression side primary valve bodies 6 and 7 are closed, but the outer circumferential portion of the secondary valve body 8 deflects downward at the time of extension and deflects upward at the time of contraction, which causes a vertical shift between the free end of the secondary valve body 8 and the opposing portion 5d. The opening area of the annular gap between the free end and the opposing portion 5d becomes larger than an opening area of the orifices formed by the cutouts 6a and 7a.

Therefore, when the piston speed is in the low-speed range, the damper D exerts a damping force in the low-speed range attributed to the resistance from the orifices formed by the cutouts 6a and 7a of the extension side and compression side primary valve bodies 6 and 7. When the piston speed changes from the extremely low-speed range to the low-speed range, the damping coefficient of the damper D decreases.

When the piston speed further increases and gets in the medium- or high-speed range from the low-speed range, the outer circumferential portion of the secondary valve body 8 naturally deflects upward or downward, and the extension side primary valve body 6 opens at the time of extension, and the compression side primary valve body 7 opens at the time of contraction.

In this embodiment, when the extension side primary valve body 6 is opened, an outer circumferential portion of the primary valve body 6 deflects downward, which allows a liquid to pass through a gap between the outer circumferential portion and the primary piston splitter 4. Similarly, when the compression side primary valve body 7 is opened, an outer circumferential portion of the primary valve body 7 deflects upward, which allows a liquid to pass through a gap between the outer circumferential portion and the primary piston splitter 4.

Therefore, when the piston speed is in the medium- or high-speed range, the damper D exerts a damping force in the medium- or high-speed range attributed to resistance from the gap caused by opening the extension side primary valve body 6 or the compression side primary valve body 7. When the piston speed changes from the low-speed range to the medium- or high-speed range, the damping coefficient of the damper D decreases.

At a certain point in the medium- or high-speed range, the deflection amount of the extension side and compression side primary valve bodies 6 and 7 may be regulated. In this case, the damping coefficient increases again at a speed at which the deflection amount of the extension side and compression side primary valve bodies 6 and 7 reach a maximum.

As described above, the sealing device S for hydraulic equipment according to this embodiment includes the primary piston splitter (outer member) 4 having an annular shape, the secondary piston splitter (inner member) 5 inserted into the primary piston splitter (outer member) 4, and the seal ring 12 housed in the annular groove 50 disposed in the outer circumference of the secondary piston splitter (inner member) 5 and abutting on the primary piston splitter (outer member) 4 to prevent a liquid from passing through the gap between the primary piston splitter (outer member) 4 and the secondary piston splitter (inner member) 5. The annular groove 50 in the secondary piston splitter (inner member) 5 has the bottom portion 51 including a recess for restraining the axial displacement of the seal ring 12 relative to the annular groove 50. According to the sealing device S with this configuration, it is possible to regulate the axial displacement of the seal ring 12 within the annular groove 50, thereby preventing a phenomenon of a liquid apparently passing through the gap between the primary piston splitter (outer member) 4 and the secondary piston splitter (inner member) 5 due to the displacement of the seal ring 12 within the annular groove 50. Furthermore, even when the seal ring 12 is provided with self-lubricating properties and subjected to surface treatment to reduce a frictional force created between the seal ring 12 and the primary piston splitter 4 or between the seal ring 12 and the secondary piston splitter 5, it is possible to regulate the axial displacement of the seal ring 12 within the annular groove 50. In other words, even when a frictional force of the seal ring 12 is reduced to enhance ease of placing the seal ring 12 in the primary piston splitter 4 and the secondary piston splitter 5, the sealing device S can regulate the axial displacement of the seal ring 12 within the annular groove 50. Therefore, according to the sealing device S of this embodiment, it is possible to enhance ease of assembly while preventing a time delay in generating a damping force in the damper D to which the sealing device S is applied. Since the recess in the bottom portion 51 of the annular groove 50 can restrain the seal ring 12, the side walls 52 and 52 of the annular groove 50 may have a width wider than an axial width of the seal ring 12 and are not necessarily in contact with the seal ring 12 after the sealing device S is assembled. However, it is preferable that the side walls 52 and 52 should be in contact with the seal ring 12 after the sealing device S is assembled and that the side walls 52 and 52 should also regulate the displacement of the seal ring 12. Furthermore, in the sealing device S according to this embodiment, the side walls 52 and 52 face each other in parallel but may be designed to face each other in other conditions.

The seal ring 12 in the sealing device S for hydraulic equipment according to this embodiment has self-lubricating properties. The seal ring 12 herein is designed to have a diameter enlarged when housed in the annular groove 50. In order to place the seal ring 12 in the annular groove 50, the seal ring 12 is required to be enlarged in diameter to be fitted into the outer circumference of the fitting portion 5a while being able to slide on the circumferential surface of the fitting portion 5a, and the seal ring 12 tightening the outer circumference of the fitting portion 5a is subjected to frictional resistance created between the seal ring 12 and the secondary piston splitter (inner member) 5. Furthermore, the seal ring 12 placed in the annular groove 50 of the secondary piston splitter (inner member) 5 has the outer circumference protruding from the fitting portion 5a when viewed from the axial direction and has an outside diameter larger than an inside diameter of the tubular portion 4b of the primary piston splitter (outer member) 4. Accordingly, when the secondary piston splitter (inner member) 5 equipped with the seal ring 12 is fitted into the tubular portion 4b of the primary piston splitter (outer member) 4, the seal ring 12 is strongly pressed against the tubular portion 4b, and the seal ring 12 is subjected to frictional resistance created between the seal ring 12 and the tubular portion 4b. In this manner, when the seal ring 12 is placed in the annular groove 50 of the secondary piston splitter (inner member) 5 and the secondary piston splitter (inner member) 5 is fitted into the primary piston splitter (outer member) 4, the seal ring 12 is subjected to frictional resistance. However, in the sealing device S according to this embodiment, the seal ring 12 has self-lubricating properties and reduces a frictional force, so that the resistance is reduced when the seal ring 12 is placed in the annular groove 50 of the secondary piston splitter (inner member) 5 and the secondary piston splitter (inner member) 5 is fitted into the primary piston splitter (outer member) 4. Accordingly, the sealing device S of this embodiment facilitates the operation of placing the seal ring 12 in the annular groove 50 disposed in the outer circumference of the fitting portion 5a of the secondary piston splitter (inner member) 5 and also facilitates the operation of fitting the secondary piston splitter (inner member) 5 equipped with the seal ring 12 into the tubular portion 4b of the primary piston splitter (outer member) 4. In order to further enhance ease of placing the seal ring 12 in the primary piston splitter (outer member) 4 and fitting the secondary piston splitter (inner member) 5 into the primary piston splitter 4, the seal ring 12 having self-lubricating properties may be subjected to surface treatment to have a smooth surface.

Furthermore, the annular groove 50 of the secondary piston splitter (inner member) 5 in the sealing device S for hydraulic equipment according to this embodiment has the bottom portion 51 including a recess, and the bottom portion 51 has the bottom surface 51a placed in the midsection in the axial direction and having the maximum recess depth and the tapered surfaces 51b and 51b disposed on both sides of the bottom surface 51a. According to the sealing device S for hydraulic equipment having this configuration, the seal ring 12 easily enters into the recess of the bottom portion 51 along the tapered surfaces 51b and 51b, and the inner circumference of the seal ring 12 is restrained by the bottom portion 51, thereby efficiently preventing a positional deviation of the seal ring 12 in the axial direction.

Figure 4:
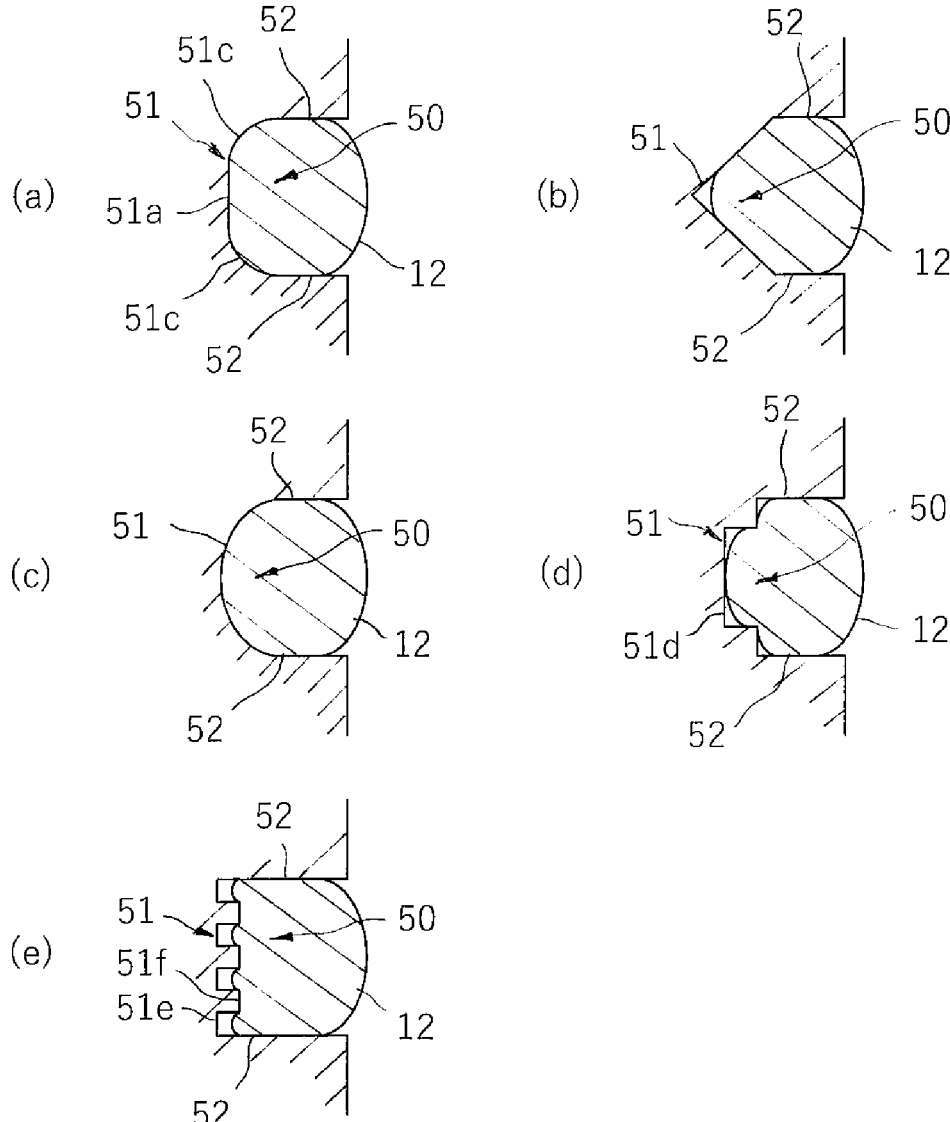
FIG. 4(a) is a partially enlarged longitudinal sectional view of an inner member in a sealing device for hydraulic equipment according to a first modification of the embodiment.
FIG. 4(b) is a partially enlarged longitudinal sectional view of an inner member in a sealing device for hydraulic equipment according to a second modification of the embodiment.
FIG. 4(c) is a partially enlarged longitudinal sectional view of an inner member in a sealing device for hydraulic equipment according to a third modification of the embodiment.
FIG. 4(d) is a partially enlarged longitudinal sectional view of an inner member in a sealing device for hydraulic equipment according to a fourth modification of the embodiment.
FIG. 4(e) is a partially enlarged longitudinal sectional view of an inner member in a sealing device for hydraulic equipment according to a fifth modification of the embodiment.

Other than the shape described above, as illustrated in FIG. 4(a), the bottom portion 51 in the annular groove 50 may include, for example, a recess having a bottom surface 51a in a midsection in FIG. 4 which has a maximum recess depth and curved surfaces 51c and 51c which are respectively continuous with upper and lower parts of the bottom surface 51a and get gradually shallower toward the side walls 52. Alternatively, as illustrated in FIG. 4(b) or FIG. 4(c), the bottom portion 51 in the annular groove 50 may include a V-shaped recess or an arc-shaped recess without the bottom surface 51a. Even when the bottom portion 51 is formed in these shapes, the inner circumference of the seal ring 12 easily enters and fits into the recess formed in the bottom portion 51 and restrained, so that it is possible to efficiently regulate the axial displacement of the seal ring 12 within the annular groove 50.

Although the bottom portion 51 forms one recess as a whole in the sealing device S according to this embodiment, as illustrated in FIG. 4(d), the bottom portion 51 in the annular groove 50 may include a recess 51d having one level lower in a midsection in the up-down direction of FIG. 4. Even when the recess 51d is formed in a part of the bottom portion 51 in this manner, the inner circumference of the seal ring 12 fits into the recess 51d formed in the bottom portion 51 and restrained, so that it is possible to regulate the axial displacement of the seal ring 12 within the annular groove 50. As described above, the recess 51d into which the inner circumference of the seal ring 12 fits may be formed in a part of the bottom portion 51 in the axial direction, and the inner circumference of the seal ring 12 may be restrained by the recess 51d in the bottom portion 51.

Alternatively, as illustrated in FIG. 4(e), the bottom portion 51 in the annular groove 50 may include a recess 51e and a protrusion 51f continuously disposed in the axial direction. When the bottom portion 51 is provided with a recess and protrusion in this manner, the inner circumference of the seal ring 12 fits into the recess and protrusion formed in the bottom portion 51 and restrained, so that is it possible to regulate the axial displacement of the seal ring 12 within the annular groove 50. The recess and protrusion may be partially disposed in the bottom portion 51 in the axial direction, or up-down direction in FIG. 4(e), as long as the recess and protrusion regulate the axial displacement of the seal ring 12 within the annular groove 50.

The damper D according to this embodiment includes the cylinder 1, the piston 2 inserted into the cylinder 1 while being axially movable and including the passage P configured to partition the interior of the cylinder 1 into the extension side chamber L1 and the compression side chamber L2 and to communicate the extension side chamber L1 and the compression side chamber L2, the rod 3 inserted into the cylinder 1 while being axially movable and connected to the piston 2, the valve V configured to open and close the passage P, and the sealing device S. The piston 2 includes the primary piston splitter (outer member) 4 and the secondary piston splitter (inner member) 5. According to the damper D with this configuration, at the time of extension or contraction at an extremely low speed, the sealing device S prevents a phenomenon of a liquid apparently bypassing the valve V in the passage P and passing through the gap between the primary piston splitter (outer member) 4 and the secondary piston splitter (inner member) 5. Accordingly, without reducing a rate of flow passing through the valve V, the damper D of this embodiment enables creation of a damping force as designed from the beginning of operation and prevents a time delay in generating a damping force.

In the above description, the annular groove 50 is disposed in the secondary piston splitter 5 as the inner member, and the seal ring 12 is placed in the secondary piston splitter 5. However, an annular groove for housing the seal ring 12 may be disposed in a part of the primary piston splitter 4 as the outer member which fits into the secondary piston splitter 5.

Furthermore, the seal ring 12 in this embodiment is an O-ring having a circular cross section but may be of any type as long as it fits into the recess of the bottom portion 51 of the annular groove 50 and the axial displacement within the annular groove 50 is regulated. Therefore, the cross section of the seal ring 12 does not necessarily have a circular shape, and the inner circumference may be shaped to coincide with the recess of the bottom portion 51 to be fitted thereinto. In a case where the seal ring 12 is placed in an annular groove disposed in an outer member, the outer circumference of the seal ring 12 may be shaped to coincide with a recess of a bottom portion of the annular groove in the outer member.

In addition, in the damper D according to this embodiment, an annular groove 11a is disposed in the outer circumference of the free piston 11, and the annular groove 11a houses a seal ring 60 slidably in contact with the inner circumference of the cylinder 1. The sealing device S for hydraulic equipment may also be used to seal a gap between the cylinder 1 as an outer member and the free piston 11 as an inner member. Specifically, in the damper D illustrated in FIG. 1, as similar to the structure of the annular groove 50, the annular groove 11a of the free piston 11 has a bottom portion lib including a recess having a bottom surface 11c in a midsection in the axial direction and tapered surfaces lid continuous with upper and lower parts of the bottom surface 11c, thereby regulating the axial displacement of the seal ring 60. When the damper D extends or contracts at an extremely low speed and the seal ring 60 moves axially relative to the free piston 11 within the annular groove 11a, an amount of liquid passing to and from the extension side chamber L1 and the compression side chamber L2 is reduced, which causes a time delay in generating a damping force at the beginning of extension or contraction. However, in the damper D according to this embodiment, since the axial displacement of the seal ring 60 within the annular groove 11a is regulated, it is possible to eliminate a time delay in generating a damping force in this damper D.

Figure 5:
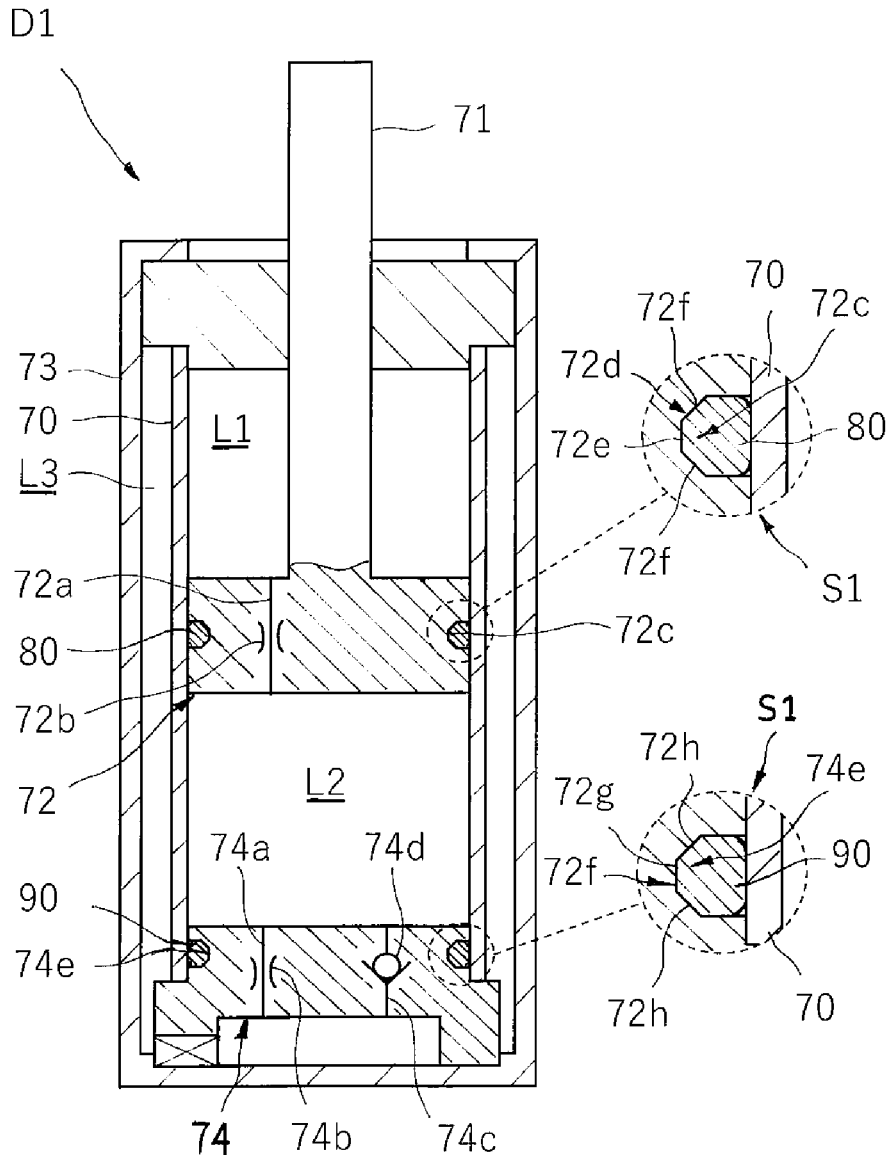
FIG. 5 is a longitudinal sectional view of a damper to which a sealing device according to a sixth modification of the embodiment is applied.

Alternatively, as illustrated in FIG. 5, a damper D1 may include a cylinder 70, a rod 71 inserted into the cylinder 70 while being axially movable, a piston 72 as a partition wall inserted into the cylinder 70, and a sealing device S1. The piston 72 includes a passage 72a which partitions the interior of the cylinder 70 into two hydraulic chambers, that is, an extension side chamber L1 and a compression side chamber L2, and communicates the extension side chamber L1 and the compression side chamber L2. With the cylinder 70 serving as an outer member and the piston 72 serving as an inner member, the sealing device S1 includes a seal ring 80 housed in an annular groove 72c disposed in the outer circumference of the piston 72 and configured to adhere closely to the inner circumference of the cylinder 70. The piston 72 includes the passage 72a communicating the extension side chamber L1 and the compression side chamber L2 and a valve 72b disposed in the passage 72a and configured to offer resistance to a flow of a liquid passing through the passage 72a.

The damper D1 also includes an outer shell 73 which covers the outer circumference of the cylinder 70 and forms a reservoir L3 filled with a liquid and gas between the outer shell 73 and the cylinder 70. The cylinder 70, the rod 71, the piston 72, and the outer shell 73 constitute a damper main body.

A lower end of the cylinder 70 is provided with a valve case 74 which separates the compression side chamber L2 and the reservoir L3 inside the damper main body. The valve case 74 includes a passage 74a communicating the compression side chamber L2 and the reservoir L3, a valve 74b disposed in the passage 74a, and a suction passage 74c provided with a check valve 74d which allows a unidirectional flow of a liquid from the reservoir L3 to the compression side chamber L2. As described above, the damper D1 is what is called a twin-tube damper including the reservoir L3 between the cylinder 70 and the outer shell 73 disposed in the outer circumference of the cylinder 70.

In the damper D1 according to this embodiment, as similar to the structure of the annular groove 50, the annular groove 72c of the piston 72 has a bottom portion 72d including a recess having a bottom surface 72e in a midsection in the axial direction and tapered surfaces 72f and 72f continuous with upper and lower parts of the bottom surface 72e, thereby regulating the axial displacement of the seal ring 80. When the damper D1 extends or contracts at an extremely low speed and the seal ring 80 moves axially relative to the piston 72 within the annular groove 72c, an amount of liquid passing to and from the extension side chamber L1 and the compression side chamber L2 through the valve 72b of the passage 72a is reduced, which causes a time delay in generating a damping force at the beginning of extension or contraction. However, in the damper D1 according to this embodiment, since the axial displacement of the seal ring 80 within the annular groove 72c is regulated, it is possible to eliminate a time delay in generating a damping force in this damper D1.

In the damper D1, an annular groove 74e is disposed on the outer circumference of the valve case 74, and a seal ring 90 slidably in contact with the inner circumference of the cylinder 70 is housed in the annular groove 74e. Accordingly, the sealing device S1 for hydraulic equipment may also be used to seal a gap between the cylinder 70 as an outer member and the valve case 74 as inner member. Specifically, in the damper D1 illustrated in FIG. 5, as similar to the structure of the annular groove 50, the annular groove 74e of the valve case 74 has a bottom portion 74f including a recess having a bottom surface 74g in a midsection in the axial direction and tapered surfaces 74h continuous with upper and lower parts of the bottom surface 74g, thereby regulating the axial displacement of the seal ring 90. When the damper D1 contracts at an extremely low speed and the seal ring 90 moves axially relative to the valve case 74 within the annular groove 74e, an amount of liquid passing from the compression side chamber L2 to the reservoir L3 through the valve 74b of the passage 74a is reduced, which causes a time delay in generating a damping force when the damper D1 starts to contract. However, in the damper D1 according to this embodiment, since the axial displacement of the seal ring 90 within the annular groove 74e is regulated, it is possible to eliminate a time delay in generating a damping force in this damper D1. In this manner, the sealing device S1 may also be employed in the twin-tube damper D1 and enables elimination of a time delay in generating a damping force of the damper D1.

The sealing devices S and S1 are applicable to any part within the dampers D and D1 where pressure of a liquid or gas acts on a seal ring. For example, in a case where a seal ring is housed in an annular groove disposed in the inner circumference of the rod guide 10 and used to seal a gap between the rod guide 10 as an outer member and the rod 3 as an inner member, the sealing device S is applicable for this sealing. The sealing devices S and S1 are applicable to not only the dampers D and D1 but also other hydraulic equipment such as a cylinder device configured to extend and contract by supplying a liquid to and discharging the liquid from a cylinder. In a case where the sealing device S or S1 is applied to a cylinder device, it is possible to prevent apparent reduction in amount of liquid due to axial displacement of a seal ring, thereby eliminating a time delay in generating thrust at the beginning of extension or contraction.

Note that the valves 72b and 74b may be of any type as long as they offer resistance to a flow of a liquid passing through the passages 72a and 74a and may be throttles such as orifices and chokes or may be leaf valves or other types of valves.

Although the preferred embodiment of the invention has been described in detail, modifications, variations, and changes can be made without departing from the scope of the claims.

The invention claimed is:

1. A damper comprising:
   a cylinder;
   a piston including an outer member having an annular shape and an inner member inserted into the outer member, inserted into the cylinder while being axially movable, being configured to partition an interior of the cylinder into an extension side chamber and a compression side chamber, and including a passage communicating the extension side chamber and the compression side chamber;

a rod inserted into the cylinder while being axially movable;

a seal ring housed in an annular groove disposed in one of the outer member and the inner member and abutting on another of the outer member and the inner member to prevent a liquid from passing through a gap between the outer member and the inner member; and a valve configured to open and close the passage, the annular groove is formed by a bottom portion and a pair of side walls extending in parallel from both ends of the bottom portion in an axial direction and opposing each other, the bottom portion of the annular groove includes a recess or a recess and protrusion for restraining axial displacement of the seal ring relative to the annular groove, the valve comprises a primary valve body and a secondary valve body disposed in the passage in series, the primary valve body being configured to create a damping force when piston speed is in a medium- or high-speed range, the secondary valve body being configured to create a damping force when piston speed is in an extremely low-speed range, and the seal ring placed in the annular groove being fitted into the recess or the recess and protrusion to be restrained from moving axially and to be in contact with the pair of side walls.

2. The damper according to claim 1, wherein the seal ring has a self-lubricating property.

3. The damper according to claim 1, wherein, when one of the outer member and the inner member includes the recess in the bottom portion of the annular groove, the bottom portion has a bottom surface placed in a midsection in an axial direction having a maximum recess depth and a tapered surface or a curved surface disposed on both sides of the bottom surface.

4. The damper according to claim 1, wherein the seal ring has a circular cross section.

5. The damper according to claim 1, wherein the piston including the outer member to which the primary valve body is attached and the inner member to which the secondary valve body is attached.

6. The damper according to claim 1, wherein the seal ring prevents communication between the passage and an inside of the cylinder through the gap between the outer member and the inner member.

7. The damper according to claim 1, wherein the secondary valve body is attached to the inner member, and the seal ring abuts the inner member.

8. The damper according to claim 1, wherein the seal ring is provided in the passage and prevents the extension side chamber and the compression side chamber from communicating with each other through the gap between the outer member and the inner member.

\* \* \* \* \*